United States Patent
Bilenko et al.

(10) Patent No.: US 9,330,362 B2
(45) Date of Patent: May 3, 2016

(54) TUNING HYPER-PARAMETERS OF A COMPUTER-EXECUTABLE LEARNING ALGORITHM

(71) Applicant: Microsoft Corporation, Redmond, WA (US)

(72) Inventors: Mikhail Bilenko, Bellevue, WA (US); Alice Zheng, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 13/894,429

(22) Filed: May 15, 2013

(65) Prior Publication Data

US 2014/0344193 A1   Nov. 20, 2014

(51) Int. Cl.
| | |
|---|---|
| *G06F 15/18* | (2006.01) |
| *G06N 99/00* | (2010.01) |
| *G06N 7/00* | (2006.01) |
| *G06N 5/02* | (2006.01) |
| *G06K 9/62* | (2006.01) |

(52) U.S. Cl.
CPC ............ *G06N 99/005* (2013.01); *G06K 9/6256* (2013.01); *G06K 9/6269* (2013.01); *G06N 5/025* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 8,694,303 | B2 * | 4/2014 | Hopkins et al. | 704/2 |
| 8,751,273 | B2 * | 6/2014 | Pinto et al. | 705/7.11 |
| 2003/0033127 | A1 * | 2/2003 | Lett | 703/11 |
| 2008/0215513 | A1 | 9/2008 | Weston et al. | |
| 2010/0325072 | A1 | 12/2010 | Truemper | |
| 2011/0231356 | A1 | 9/2011 | Vaidyanathan et al. | |

OTHER PUBLICATIONS

On the parameter optimization of Support Vector Machines for binary classification Paulo Gaspar1, Jaime Carbonell2 and Jos'e Lu'is Oliveira1 doi:10.2390/biecoll-jib-2012-201.*
Stochastic Gradient Descent Tricks Léon Bottou Microsoft Research, Redmond, WA leon@bottou.org http://leon.bottou.org Springer-Verlag Berlin Heidelberg 2012.*
Building Predictive Models in R Using the caret Package Max Kuhn Nov. 2008, vol. 28, Issue 5.*
Algorithms for Hyper-Parameter Optimization James Bergstra, R'emi Bardenet, Yoshua Bengio, Bal'azs K'egl (NIPS 2011).*
Tuning SVMparametersbyusingahybridCLPSO—BFGSalgorithm Shutao Li, Mingku iTan Neurocomputing 73(2010) 2089-2096.*

(Continued)

*Primary Examiner* — Kakali Chaki
*Assistant Examiner* — Ababacar Seck
(74) *Attorney, Agent, or Firm* — Alin Corie; Sandy Swain; Micky Minhas

(57) ABSTRACT

Technologies pertaining to tuning a hyper-parameter configuration of a learning algorithm are described. The learning algorithm learns parameters of a predictive model based upon the hyper-parameter configuration. Candidate hyper-parameter configurations are identified, and statistical hypothesis tests are undertaken over respective pairs of candidate hyper-parameter configurations to identify, for each pair of candidate hyper-parameter configurations, which of the two configurations is associated with better predictive performance. The technologies described herein take into consideration the stochastic nature of training data, validation data, and evaluation functions.

20 Claims, 6 Drawing Sheets

(56) References Cited

OTHER PUBLICATIONS

Gaspar, et al., "On the Parameter Optimization of Support Vector Machines for Binary Classification", In Proceedings of Journal of Integrative Bioinformatics, vol. 9, Issue 3:201, 2012, 11 Pages.

Nelder, et al., "A Simplex Method for Function Minimization", Published in the Computer Journal, vol. 7, Issue 4, 1965, pp. 308-313.

Snoek, et al., "Practical Bayesian Optimization of Machine Learning Algorithms", In Proceedings of Advances in Neural Information Processing Systems, Dec. 31, 2012, pp. 2951-2959.

"International Search Report and Written Opinion Issued in PCT Patent Application No. PCT/US2014/038039", Mailed Date: Feb. 23, 2015, 11 Pages.

"International Preliminary Report on Patentability Issued in PCT Application No. PCT/US2014/038039", Mailed Date: Sep. 25, 2015, 8 Pages.

"Response to the International Search Report (ISR) and Written Opinion for PCT Patent Application No. PCT/US2014/038039", Filed Date: May 20, 2015, 10 pages.

Do, et al., "Efficient Multiple Hyperparameter Learning for Log-Linear Models", Retrieved at <<http://ai.stanford.edu/~chuongdo/papers/learn_reg.pdf>>, In Neural Information Processing Systems, Dec. 3, 2007, pp. 1-8.

Momma, et al., "A Pattern Search Method for Model Selection of Support Vector Regression", Retrieved at <<http://siam.org/proceedings/datamining/2002/dm02-16MommaM.pdf>>, In Proceedings of the SIAM International Conference on Data Mining, Apr. 11, 2002, pp. 1-14.

Marzat, et al., "Min-Max Hyperparameter Tuning, with Application to Fault Detection", Retrieved at <<http://julien.marzat.free.fr/Publications/IFAC%20WC%202011/IFAC11_0476.pdf>>, In Proceedings of the 18th IFAC World Congress, Aug. 28, 2011, pp. 1-6.

White, John Myles, "Automatic Hyperparameter Tuning Methods", Retrieved at <<http://www.johnmyleswhite.com/notebook/2012/07/21/automatic-hyperparameter-tuning-methods/>>, Jul. 21, 2012, pp. 1-4.

Bergstra, et al., "Algorithms for Hyper-Parameter Optimization", Retrieved at <<http://books.nips.cc/papers/files/nips24/NIPS2011_1385.pdf>>, In Proceedings of the 25th Annual Conference on Neural Information Processing Systems, Dec. 12, 2011, pp. 1-9.

Strens, et al., "Policy Search Using Paired Comparisons", Retrieved at <<http://jmlr.csail.mit.edu/papers/volume3/strens02a/strens02a.pdf>>, Journal of Machine Learning Research, 3(1):, 2002, pp. 921-950.

* cited by examiner

TUNING HYPER-PARAMETERS OF A COMPUTER-EXECUTABLE LEARNING ALGORITHM

BACKGROUND

Supervised machine learning techniques are employed in connection with learning parameters of respective predictive models, wherein a predictive model is configured to perform a prediction upon receipt of input data as a function of its learned parameters. Exemplary predictive models include binary classifiers (such as spam detectors that receive an e-mail and indicate whether or not such e-mail is spam), multi-class classifiers, search engine ranking algorithms, clickthrough-rate predictors, etc.

Supervised machine learning techniques are increasingly being used as black-box systems by engineers, who expect such systems to output predictive models that produce high accuracy predictions in an automated fashion. As noted above, in general, supervised machine learning techniques include the use of a learning algorithm, which learns parameters of a predictive model that cause performance of the predictive model to be optimized utilizing a training/validation data set. The learning algorithm itself has parameters, which are referred to herein as hyper-parameters. Exemplary hyper-parameters can include a learning rate of the learning algorithm, a regularization coefficient of the learning algorithm, preprocessing options, structural properties of a predictive model that is to be learned (e.g., a maximum number of leaves in a regression tree), etc.

Conventionally, values for hyper-parameters of a learning algorithm have been selected manually by an engineer as a function of experience of the engineer with the learning algorithm (e.g., the engineer may understand that a predictive model will operate satisfactorily if certain hyper-parameter values are used when training the predictive model) and/or repeated experiments on validation sets. In some instances, however, the hyper-parameter values chosen by the engineer may be significantly sub-optimal. Further, time constraints may prevent performance of a sufficient number of experiments over validation sets.

Other approaches have also been contemplated for determining hyper-parameter values for learning algorithms. One exemplary approach is a global optimization algorithm (e.g., a direct search derivative-free optimization algorithm), which can be employed in connection with identifying hyper-parameter values that cause a resultant predictive model to perform relatively well. Such direct search derivative-free optimization algorithms, however, fail to take into account that training data and validation data (and therefore values output by evaluation functions) may be stochastic (noisy) in nature. Smoothing such noise can be accomplished by averaging the results of multiple experiments by way of cross validation or bootstrapping frameworks. However, this results in much slower execution due to the need to perform many experiments at each evaluation point.

SUMMARY

The following is a brief summary of subject matter that is described in greater detail herein. This summary is not intended to be limiting as to the scope of the claims.

Described herein are various technologies pertaining to hyper-parameter tuning. The technologies described herein for hyper-parameter tuning include selecting a hyper-parameter configuration of a learning algorithm that optimizes performance of a predictive model learned through use of the learning algorithm with respect to a training/validation data set. Such technologies are particularly well-suited for cases where the training/validation data set may be stochastic, and thus values output by a function that evaluates performance of the predictive model are likewise stochastic. Specifically, statistical hypothesis testing is used to take into consideration the stochastic nature of training/validation data sets, while allowing for efficient identification of hyper-parameter values.

In still more detail, an indication is received that a particular configuration of hyper-parameters of a learning algorithm is desirable, wherein the learning algorithm is configured to learn a predictive model through use of a particular training/validation data set, which may be noisy. The training/validation data set includes numerous data objects that are labeled with values that are indicative of target(s) of learning. In a non-limiting example, a predictive model may be desirably trained that is configured to identify whether or not a received email is spam. In such a case, the training/validation data can include numerous e-mails with respective labels assigned thereto that indicate whether or not such e-mails are spam.

Responsive to receiving the indication that the hyper-parameters of the learning algorithm are desirably tuned, a candidate set of hyper-parameter configurations of learning algorithm are identified. For instance, with respect to a hyper-parameter that is limited to discrete values from a finite space (e.g., a number of leaves in a regression tree), candidate values for such hyper-parameter can include discrete values from the finite space (e.g., all discrete values). In another example, with respect to a hyper-parameter corresponding to a continuous space (e.g., a regularization parameter), a suitable search algorithm can be employed to walk through the continuous space and candidate values. An exemplary search algorithm is the Nelder-Mead algorithm.

For each candidate hyper-parameter configuration, the learning algorithm learns a respective predictive model based upon a set of training data, such that parameters of a predictive model are optimized based upon a respective hyper-parameter configuration of the learning algorithm and the set of training data. In an exemplary embodiment, predictive models can be learned using the same set of training data.

A pair-wise analysis can subsequently be undertaken over candidate hyper-parameter configurations, wherein such pair-wise analysis includes the use of a statistical hypothesis test to identify which candidate configuration in the pair causes its respective predictive model to output more accurate predictions (when compared with the other predictive model in the pair). With more particularity, a pair of predictive models (learned based upon a pair of candidate hyper-parameter configurations) are provided with a first, common set of validation data, and output predictions pertaining to such first set of validation data. An evaluation function receives the output predictions (and corresponding labels for the first set of validation data), and outputs data that is indicative of performances of the predictive models for the first set of validation data. A statistical hypothesis test is used to analyze the outputs of the evaluation function, and if it is ascertained that one predictive model outperforms the other in a statistically significant manner, then the hyper-parameter configuration associated with the poorer performing predictive model is discarded, while the other is retained as a preferred candidate. If the statistical hypothesis test does not detect a statistically significant difference in the performance of the predictive models, then another trial can be performed (e.g., another set of validation data is used to evaluate performance of the predictive models). This process can continue until it is determined that difference in performance of the predictive models is statistically insignificant (e.g., a threshold number of trials is performed), or one predictive model is found to (statistically significantly) outperform the other, and thus one hyper-parameter configuration is better than the other. This process can be performed for multiple pairs of candidate configurations, and iterated until an optimal hyper-parameter configuration is identified, or a computation budget is exhausted.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
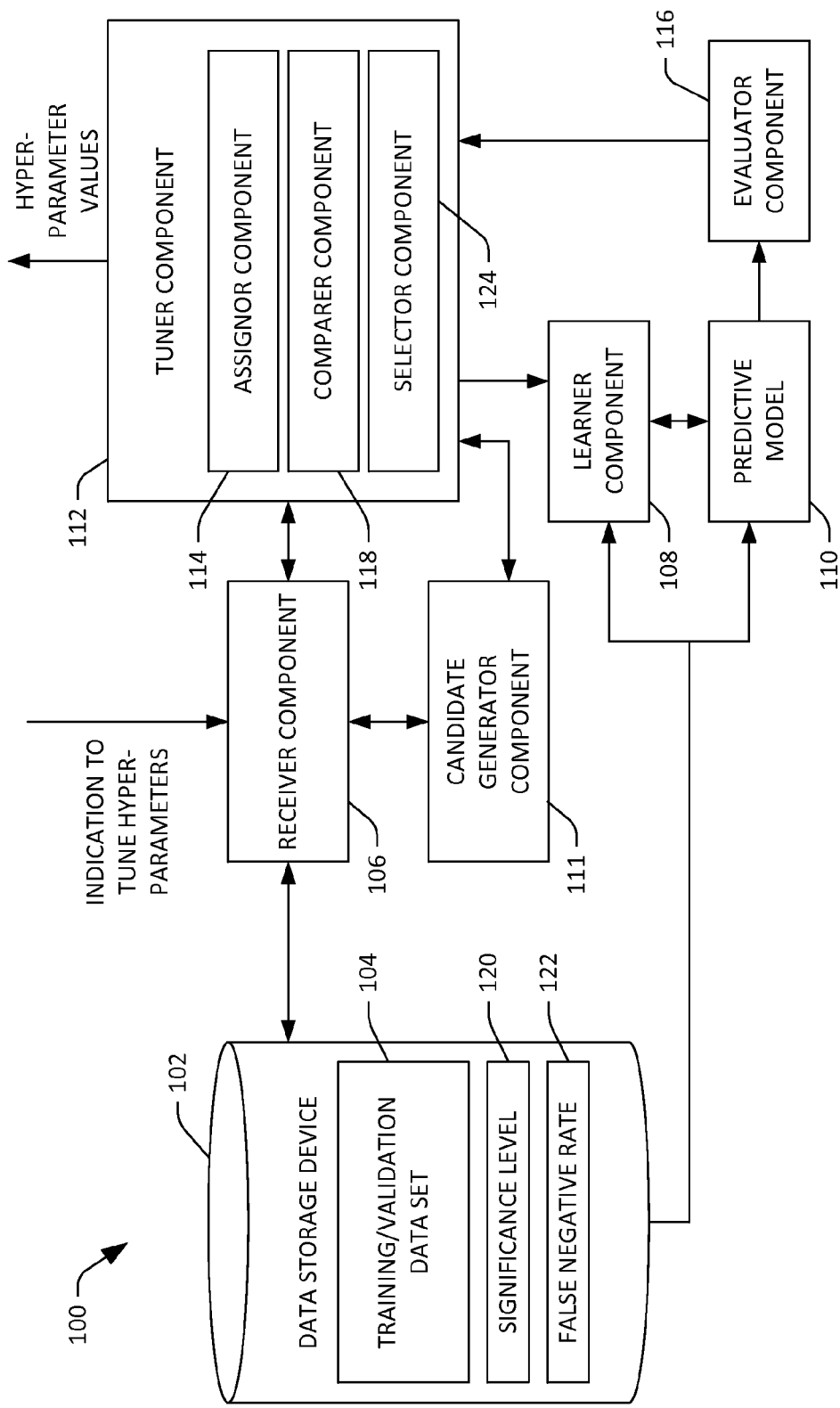
FIG. 1 is a functional block diagram of an exemplary system that facilitates tuning hyper-parameters of a learning algorithm.

Various technologies pertaining to hyper-parameter tuning are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to hyper-parameter tuning. Hyper-parameter tuning for machine learning is a stochastic optimization problem, wherein the stochasticity arises from the fact that training data sets and validation data sets are finite samples (typically assumed to be independently and identically distributed) from an underlying joint distribution of data points and prediction targets, as well as from possible randomness built into a learning algorithm and/or evaluation function. With more specificity, a learning algorithm is configured to learn parameters of a predictive model based at least in part upon hyper-parameters of the learning algorithm. Exemplary hyper-parameters include a learning rate, a regularization coefficient, a pre-processing option, etc. In another example, hyper-parameters for a gradient boosting learning algorithm used for learning a predictive model that is an ensemble of regression trees includes a maximum number of leaves per tree, as well as a boosting learning rate. Thus, hyper-parameters parameterize the learning algorithm, where the learning algorithm is then used to learn parameters of a predictive model. It can therefore be ascertained that performance of a predictive model is not only a function of training data used to learn parameters of the predictive model, but is also a function of the hyper-parameters of the learning algorithm. The technologies described herein relate to efficiently identifying an optimal hyper-parameter configuration for a learning algorithm based upon a training/validation data set.

With reference now to FIG. 1, an exemplary system 100 that facilitates tuning hyper-parameters of a learning algorithm that is employed to learn parameters of a predictive model is illustrated. The system 100 comprises a data storage device 102 that includes a training/validation data set 104. While shown as being a single data set, it is to be understood that in an exemplary embodiment, validation data can be held out from training data (e.g., such as when cross-validation is employed to ascertain performance of a predictive model). The training/validation data set 104 includes a plurality of data objects, wherein each object has a respective label assigned thereto, and wherein the label corresponds to a target of learning. Accordingly, for example, if the training/validation data set 104 is to be used in connection with developing a predictive model for detecting spam, the data objects in the training/validation data set 104 can comprise e-mails with respective labels assigned thereto that indicate whether or not e-mails are spam.

The system 100 further comprises a receiver component 106 that receives an indication that a hyper-parameter configuration of a learner component 108 is to be ascertained. The learner component 108 is or includes a computer-executable learning algorithm that is configured to learn parameters of a predictive model 110 based upon a hyper-parameter configuration of the learning algorithm and training data in the training/validation data set 104.

The system 100 further comprises a candidate generator component 111 that is configured to identify candidate hyper-parameter configurations for purposes of analysis. In an example, the candidate generator component 111 can identify candidate hyper-parameter values for a hyper-parameter associated with a finite space (e.g., where each candidate value is discrete in nature). In an exemplary embodiment, a hyper-parameter of the learning algorithm may have a finite number of potential values. For instance, the hyper-parameter may indicate a number of hidden layers in a deep neural network (DNN), a number of leaves in a regression tree, etc. The candidate generator component 111 can be configured to enumerate each candidate value for such hyper-parameter. In another example, a hyper-parameter of the learning algorithm may have an infinite number of potential values that can be selected from a continuous space. Pursuant to an example, the hyper-parameter can be a regularization coefficient, which can be any value between zero and one. The candidate generator component 111 can walk through the continuous space and select candidate values for analysis. For instance, the candidate generator component 111 can utilize the Nelder-Meade algorithm to identify candidate hyper-parameter values. Thus, a candidate hyper-parameter configuration can be a value for a hyper-parameter or values for numerous respective hyper-parameters of the learning algorithm of the learner component 108.

The system 100 can further comprise a tuner component 112 that is in communication with the receiver component 106 and the candidate generator component 111. The tuner component 112 is configured to perform hyper-parameter tuning for hyper-parameters of the learning algorithm, such that an optimal hyper-parameter configuration for learning parameters of the predictive model 110 is identified. Generally, the tuner component 112 is further configured to perform statistical hypothesis testing over pairs of candidate hyper-parameter configurations in connection with identifying the optimal hyper-parameter configuration for the learner component 108 when learning parameters of the predictive model 110 given the training/validation data set 104. With more specificity, the tuner component 112 is configured to evaluate performance of candidate hyper-parameter configurations in a pair-wise manner, retaining a candidate hyper-parameter configuration in a pair with an associated performance found to be better, in a statistically significant manner, than the other candidate hyper-parameter configuration in the pair. Thus, using statistical hypothesis testing, for selected pairs of candidate hyper-parameter configurations, the tuner component 112 can relatively efficiently discard a candidate hyper-parameter configuration that is found to be outperformed in a statistically significant manner by another hyper-parameter configuration. Through use of statistical hypothesis testing, the tuner component 112 can take into consideration the stochastic nature of data in the training/validation data set 104, potential stochastic nature of the learner component 108, and potential stochastic nature of an evaluation function used to evaluate performance associated with candidate hyper-parameter configurations.

With still more specificity as to operation of the tuner component 112, the tuner component 112 can include an assignor component 114 that can receive a pair of candidate hyper-parameter configurations from the candidate generator component 111 and assign each candidate hyper-parameter configuration in the pair to the learning algorithm of the learner component 108. The learner component 108 is configured to learn two predictive models based on training data in the training/validation data set 104: one for each candidate hyper-parameter configuration in the pair. In an exemplary embodiment, the learner component 108 can learn the predictive models using a common set of training data. Generally, the learner component 108 learns parameters of a predictive model by optimizing the parameters of the predictive model using a modeling objective function.

To analyze performance of the predictive model 110, such predictive model 110 can be provided with a set of validation data from the training/validation data set 104. The set of validation data can be data held out from the training set (e.g., a held out set) used by the learner component 108 to learn parameters of the predictive model 110. The held-out set can be constructed via a methodology such as cross-validation or bootstrapping. While not shown, each predictive model in the above-mentioned pair can be provided with the same validation set, and an evaluator component 116 can output respective observations that are indicative of performance of the predictive models over the validation set. The system evaluator component 116 can be or include an evaluation function that is configured to output the above-mentioned observations.

The tuner component 112 includes a comparer component 118 that can perform a comparison over a pair of observations output by the evaluator component 116 for the respective pair of predictive models. When doing so, the comparer component 118 can perform statistical hypothesis testing over the pair of observations. To that end, the data storage device 102 can include a defined significance level 120 and a defined false negative rate 122, and the comparer component 118 can perform the statistical hypothesis test over the pair of observations based upon the significance level 120. In an exemplary embodiment, power analysis can be undertaken on top of the statistical hypothesis test, and can be employed to ascertain how many additional samples (evaluations) are expected to be required to determine whether the difference in performance between a pair of observations is statistically significant. Summarily, using the statistical hypothesis test, the comparer component 118 can ascertain whether one of the predictive models in the pair (and therefore one of the corresponding candidate hyper-parameter configurations in the pair) outperforms the other in a statistically significant manner when considering the validation set.

The tuner component 112 can further comprise a selector component 124 that can select one of the candidate hyper-parameter configuration from the evaluated pair of candidate hyper-parameter configurations if such candidate hyper-parameter configuration outperforms the other in a statistically significant manner. If it is ascertained by the selector component 124 that a level of desired statistical significance difference of performance is unmet, then the selector component 124 can cause an additional trial to be undertaken. That is, the selector component 124 can cause the pair of predictive models to receive a second set of validation data from the training/validation data set 104, and the evaluator component 116 thereby outputs observations as to performances of the respective predictive models over the first and second sets of validation data. Further, in an exemplary embodiment, when the selector component 124 ascertains that there is not a statistically significant difference in performance between the pair of predictive models, the learner component 108 can be configured to re-learn parameters of the predictive models by re-sampling from the training/validation data set 104, and the selector component 124 can then cause the pair of predictive models (e.g., retrained) to receive additional validation data from the training/validation data set 104.

The acts of the evaluator component 116, the comparer component 118, and the selector component 124 can be repeated until a difference in performance between the predictive models in the evaluated pair rises above a statistically significant level or until a threshold number of trials has been undertaken (in which case both candidate hyper-parameter configurations corresponding to the pair of predictive models can be retained as candidate hyper-parameter configurations). After the pair-wise evaluation is completed, another pair of predictive models (corresponding to another pair of candidate hyper-parameter configurations) can be evaluated, until an optimal hyper-parameter configuration (for the training data in the training/validation data set 104) is identified.

While the description above indicates an exhaustive pair-wise analysis pertaining to hyper-parameter configurations, in other embodiments the system 100 can be configured to perform a batch analysis with respect to hyper-parameter configurations. Thus, for instance, the comparer component 118 can be configured to perform pairwise tests for every pair of candidate configurations, and the selector component 124 can eliminate candidates found to be worse (statistically significantly worse) than any other candidate. If the comparer component 118, for a particular pair of candidate configurations, determines that there is no statistically significant difference between observations corresponding to such candidate configurations, can cause a power analysis to be executed. Such power analysis can indicate, for instance, that five more evaluations are needed for a first candidate configuration in the pair, while three more evaluations are needed for the second configuration in the pair, to allow for the comparer component 118 to ascertain a statistically significant difference in performance. For each candidate, a number of evaluations needed for each comparison including the candidate can be retained. First, the smallest number is selected for such candidate, since it may be eliminated if it is determined to be suboptimal relative to another candidate. Thereafter, once the number of evaluations for each candidate is determined, tasks for running the evaluations can be batched and scheduled (e.g., evaluations can be scheduled at once, or prioritized such that higher priority evaluations are performed initially).

Additional details pertaining to various components of the system 100 are now provided. For example, θ can represent the hyper-parameters of the learner component 108, X a random variable that represents sources of stochasticity, and g(•) a performance metric output by the evaluator component 116 when evaluating performance of a predictive model. In an exemplary embodiment, for binary classification, g(•) can be the area under a receiver operating characteristic (ROC) curve (AUC), and for regression g(•) may be the negative mean squared loss. The problem of hyper-parameter tuning can then be defined as follows:

$$\theta^* = \max_\theta E_X[g(\theta, X)]. \tag{1}$$

For purposes of explanation, the only source of stochasticity can be assumed to be the training/validation data set 104, such that X represents the data distribution. Since the true mean for this unknown distribution cannot be computed directly, the empirical mean can be optimized over random samples $\{X^{(1)}, \ldots, X^{(2)}\}$ selected from the training/validation data set 104 as follows:

$$\max_\theta \frac{1}{n} \sum_i g(\theta, X^{(i)}). \tag{2}$$

As indicated above, in the tuning process undertaken by the system 100, the ith sample $X^{(i)}$ can be common for all candidate values of θ. This can occur, for instance, when a cross-validation framework is used by selecting a common validation fold. Likewise, if a bootstrap framework is used, $X^{(i)}$ can be common for all candidate values of θ by starting from the same initial random seed, ensuring generation of the same sequence of training and validation sets from the validation/training data set 104.

It can be ascertained that the evaluation of g(•) is carried out in two steps. First, the learner component 108 learns parameters of the predictive model 110 (λ) using training data in the training/validation data set 104 ($X_T$) by way of a modeling objective function $f(•)$. The predictive model 110 is than evaluated on a validation set in the training/validation data set 104 ($X_V$) under the metric g(•).

$$\lambda_\theta^* = \arg\max_\lambda E[f(\lambda, X_T, \theta)] \tag{3}$$

$$\theta^* = \arg\max_\theta E[g(\theta, \lambda_\theta^*, X_V)]. \tag{4}$$

It can be understood that $X_T$, $X_V$, and the optimization of the Eq. (3) may be stochastic. Accordingly, the empirical average of g(•) can be computed by the evaluator component 116 over samples of all three, thereby accounting for variance of the estimate of g(•).

The tuner component 112, however, need not perform full cross-validation on all possible validation data sets (e.g., all $X^{(i)}$'s) if hypothesis testing is used, such that the tuner component 112 performs evaluations over the subset of validation sets that are statistically necessary to determine which candidate hyper-parameter configurations are preferable over others. The classic example of an application for statistical hypothesis testing is the two-sample location test, where one observes two samples X and Y, each of size n and drawn from two distributions from the same family with possibly different locations (median or mean). $\mu_X$ and $\mu_Y$ can denote the true means and $\tau = \mu_X - \mu_Y$ can denote their difference. The null hypothesis $\mathcal{H}_0$ may assert that $\tau = 0$, while the alternative hypothesis $\mathcal{H}_1$ may test for $\tau > 0$, $\tau < 0$, or $\tau \neq 0$. If the distributions are Gaussian and the samples are matched (e.g., X and Y include the same individuals under two different treatments), then the matched pairs t-test can be used to decide whether to accept or reject the null hypothesis while guaranteeing a false positive rate. Such test computes the t-statistic as follows:

$$T_{X-Y} = \frac{\hat{\mu}_{X-Y}}{\hat{\sigma}_{X-Y}/\sqrt{n}}, \tag{5}$$

where $\mu_{X-Y} = \Sigma_i(x_i - y_i)/n$ and $\sigma_{X-Y}^2 = \Sigma_i((x_i - y_i) - \hat{\mu}_{X-Y})^2/(n-1)$ are, respectively, the sample mean and variance of the matched differences. Under the null hypothesis, $T_{X-Y}$ follows the Student's t-distribution with n−1 degrees of freedom. $\mathbb{T}_{n-1}$ can denote the cumulative distribution function (cdf) of such distribution (e.g., an approximation for the Student's t-distribution).

The statistical hypothesis testing procedure explicitly controls for the probability of false positives (Type I error). That is, statistical hypothesis testing would only reject the null hypothesis when the probability of observing the statistic falls below a given threshold a (the significance level 120). $t_\alpha$ can denote the α-th quantile of the Student's t-distribution, e.g. $\mathbb{T}(t_\alpha)=\alpha$. If the alternative hypothesis is $\{\tau>0\}$ then $\mathcal{H}_0$ can be rejected and $\mathcal{H}_1$ can be accepted if $T_{X-Y}>t_{1-\alpha}$.

The false negative probability (Type II error) can be controlled by increasing the number of evaluations at each point in a procedure, known as power analysis. The "power" of a statistical test is the probability that it correctly rejects $\mathcal{H}_0$ when $\mathcal{H}_1$ is true. For instance, if $\mathcal{H}_1=\{\tau>0\}$, then the power of the matched pairs t-test can be written as follows:

$$P(\text{reject } \mathcal{H}_0 | \mathcal{H}_1 \text{ is true}) = P(T_{X-Y} > t_{1-\alpha} | \tau > 0) \quad (6)$$

$$= P\left(T_{X-Y} - \frac{\tau}{\frac{\hat{\sigma}_{X-Y}}{\sqrt{n}}} > t_{1-\alpha} - \frac{\tau}{\frac{\hat{\sigma}_{X-Y}}{\sqrt{n}}} \middle| \tau > 0\right)$$

$$= 1 - \mathbb{T}_{n-1}\left(t_{1-\alpha} - \frac{\tau}{\frac{\hat{\sigma}_{X-Y}}{\sqrt{n}}}\right).$$

$\beta$ can denote the false negative rate 122. Given $\beta$ and a value for $\tau$, the necessary sample size to guarantee that the probability of a false negative is below $\beta$ when the test accepts the null hypothesis can be computed.

For hyper-parameters that are discreet and have no structure to exploit, selecting the best hyper-parameter configuration can be viewed as a race that includes a sequence of rounds corresponding to evaluations of hyper-parameter configurations using different folds or samples of validation data from the training/validation data set 104 for different rounds. In each round, some candidates are eliminated and further evaluations are scheduled. At the beginning of a round, all remaining candidates are evaluated in a pair-wise manner. If a statistical hypothesis test accepts the alternative hypothesis that candidate i performs worse than j, then i is eliminated as a candidate configuration. Conversely, if the test accepts the null hypothesis of equal performance, the number of evaluations needed to guarantee that they are indeed equal under an acceptable false negative rate $\beta$ can be computed. It is to be noted that the power analysis in Eq. (6) is based upon $\tau$ (the expected difference in performance) or an estimate thereof. The tuner component 112 can use an observed difference in the current round as the value of $\tau$. At the end of a round, inferior candidate hyper-parameter configurations are eliminated, and more evaluations are scheduled in batch for the remaining candidates. Alternatively, evaluations can be added in mini-batches with retesting done at the end of every mini-batch. The exemplary algorithm, set forth below, can be performed by the system 100.

Algorithm 1:

```
Input: C = {θ₁, ... , θₘ}: candidate set of hyper-parameter configurations)
Input: α: Statistical Significance level
Input: β: False negative rate
Input: n₀: Number of initial evaluations
Input: (X_{T₁}, X_{V₁}), ... , (X_{Tₙ}, X_{Vₙ}): Sequence of training and validation sets
Output: θ*: Optimal hyper-parameter configuration
for i = 1, ... , m do
  for l = 1, ... , n₀ do
    R_{il} = g(θ_i, X_{T_l}, X_{V_l})
while |C| > 1 do
  for θ_i ∈ C do
    for θ_j ≠ θ_i ∈ C do
      result = LazyPairedTCompare(R_i, R_j, α, β)
      if result < 0 then C = C\θ_i
      else if result > 0 then C = C\θ_j
return C
```

An exemplary algorithm for the function LazyPairedTCompare is set forth below.

Algorithm 2:

```
Input: X, Y: Paired observations
Input: α: Statistical Significance level
Input: β: False negative rate
Input: MaxN: Maximum number of observations
Output: 0 (μ_X = μ_Y), 1 (μ_X > μ_Y), -1 (μ_X < μ_Y) with significance α
n := min(|Y|, |X|)

μ̂_{X-Y}
T_{X-Y} := ─────────
         σ̂_{X-Y}
         ───────
           √n t_{α/2} := α/2-th quantile of Student's T distribution
t_{1-α/2} := (1 - α/2)-th quantile of Student's T distribution
if T_{X-Y} < t_{α/2}, then return -1              // μ_X < μ_Y
else if T_{X-Y} > t_{1-α/2}, then return 1        // μ_X > μ_Y
else
  if n = MaxN then return 0                      // μ_X = μ_Y
  n' := PowerAnalysis(T_{X-Y}, β)
  if n' > n then
    X',Y' := Get (n' - n) more samples of X and Y
    return LazyPairedTCompare(X', Y')
  else return 0.
```

When the hyper-parameter space is metric and continuous, the algorithms set forth above can be combined with a global optimization routine, such as direct search. As an illustration, the algorithms can be integrated with the Nelder-Mead algorithm, a classic simplex-based technique. For instance, the candidate generator component 111 can be or include the Nelder-Mead algorithm. The Nelder-Mead algorithm operates sequentially, starting out with a simplex of d+1 initialization points (for d parameters). $\{\theta_0, \theta_1, \ldots, \theta_d\}$ can represent the simplex vertices ranked from worst to best by their respective values on the response surface $g(\theta_0), \ldots, g(\theta_d)$. On each step, the Nelder-Mead algorithm tries to move $\theta_0$, the worst-performing point, toward or beyond the rest of the simplex. It does so via line search from $\theta_0$ towards $\theta_c = \sum_{i=1}^{d} \theta_i / d$, the centroid of the rest of the simplex.

An exemplary Nelder-Mead algorithm is set forth below for purposes of explanation, where comparison steps in the classic Nelder-Mead algorithm can be replaced with Algorithm 2 set forth above:

Algorithm 3

Input: Initial simplex $\{\theta_0, \theta_1, \ldots, \theta_d\}$, objective function $g(\theta)$, evaluations $\{g(\theta_0), g(\theta_1), \ldots, g(\theta_d)\}$
Output: A local maximum of $g(\bullet)$
Define all comparisons of $g(\theta)$ using Algorithm 2
Run Nelder-Mead algorithm
Evaluations are added until the test decision can guarantee the desired false positive and false negative probabilities.

It can be ascertained that, with respect to some learning algorithms, the space of candidate hyper-parameter configurations can be relatively large, such that numerous pairs of candidate hyper-parameter configurations may desirably be analyzed. In such a circumstance, the system 100 can operate in a distributed fashion, such that several candidate pairs of hyper-parameter configurations are evaluated in parallel across numerous computing devices.

Figure 2:
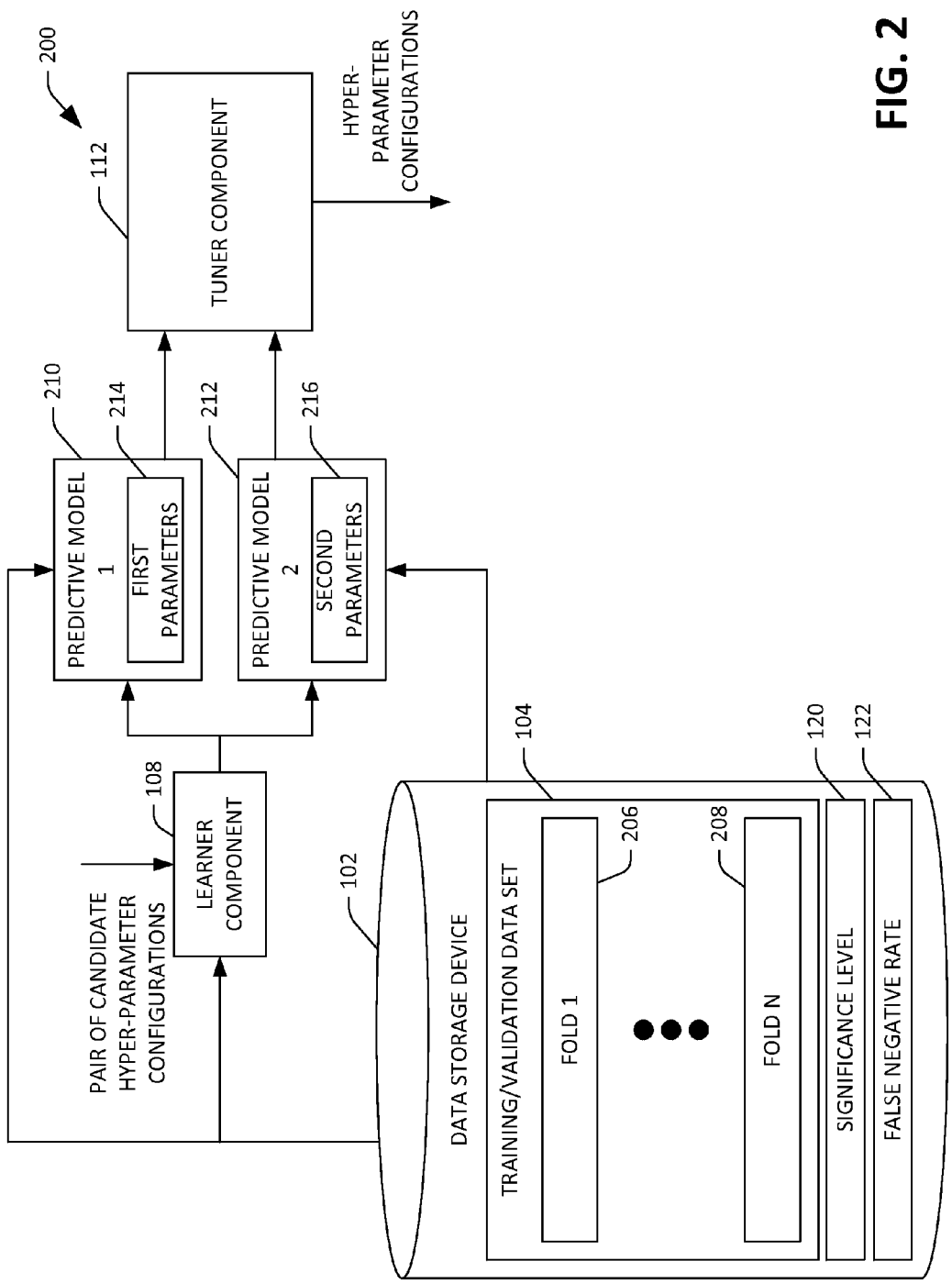
FIG. 2 is a functional block diagram of an exemplary system that facilitates tuning hyper-parameters of a learning algorithm.

Now referring to FIG. 2, another exemplary system 200 that facilitates performing hyper-parameter tuning is illustrated. The system 200 includes the data storage device 102. In the example set forth in FIG. 2, the training/validation data set 104 includes multiple folds 206-208. The system 200 comprises the learner component 108, which is provided with a pair of candidate hyper-parameter configurations. Using the pair of candidate hyper-parameter configurations, and at least some of the folds 206-208, the learner component 108 learns parameters of a first predictive model 210 and a second predictive model 212. With more specificity, the first predictive model 210 includes first parameters 214, which are based upon a first hyper-parameter configuration in the pair of candidate hyper-parameter configurations. The second predictive model 212 includes second parameters 216, which are based upon a second hyper-parameter configuration in the pair of candidate hyper-parameter configurations.

The tuner component 112 is configured to identify, in an efficient manner, which of the first predictive model 210 and the second predictive model 212 performs better, and thus which of the first hyper-parameter configuration and the second hyper-parameter configuration is associated with better performance. As described above, the tuner component 112 can make such determination by executing a statistical hypothesis test over respective observations corresponding to the first predictive model 210 and the second predictive model 212 with respect to a subset of the folds 206-208 of the training/validation data set 104. For example, the first predictive model 210 and the second predictive model 212 can be provided with a first subset of the folds 206-208, and observations as to performance of the first predictive model 210 and the second predictive model 212 can be output by the evaluator component 116 (FIG. 1). The tuner component can perform a first trial based upon the first subset of folds of the training/validation data set 104. If, based on the statistical hypothesis test (which is based on the significance level 120 and the false negative rate 122), the tuner component 112 is able to discern that one of the predictive models 210 or 212 outperforms the other, the tuner component can discard its corresponding candidate hyper-parameter configuration (while retaining the other candidate hyper-parameter configuration in the pair). Conversely, if the tuner component 112 is unable to ascertain that one of the predictive models 210 or 212 outperforms the other in a statistically significant manner, then the tuner component 112 can cause another trial to be executed using a different fold in the validation data 204 (where observations as to performance can be based upon all considered folds). This process can continue until the tuner component 112 can ascertain which of the predictive models 210 or 212 is the better performing of the predictive models 210 or 212, and thus, which of the candidate hyper-parameter configurations in the pair of candidate hyper-parameter configurations is the better of the two configurations. Using power analysis, the tuner component 112 can compute a threshold number of trials, and if such number of trials are executed and the tuner component 112 is unable to identify which of the predictive models 210 or 212 is the better performing of the two models, then both candidate hyper-parameter settings in the pair of hyper-parameter settings can be retained for subsequent evaluation.

As indicated above, while the description herein describes the process of comparing a pair of candidate hyper-parameter configurations, in practice numerous pairs of candidate hyper-parameter configurations exist. In such case, the systems 100 and 200 can perform acts described above to facilitate pair-wise comparison of all pairs, and thereafter further evaluations can be scheduled for remaining candidates (candidates not found to be inferior (statistically significantly) to others). Such process can repeat until an optimal candidate configuration is located.

Figure 3:
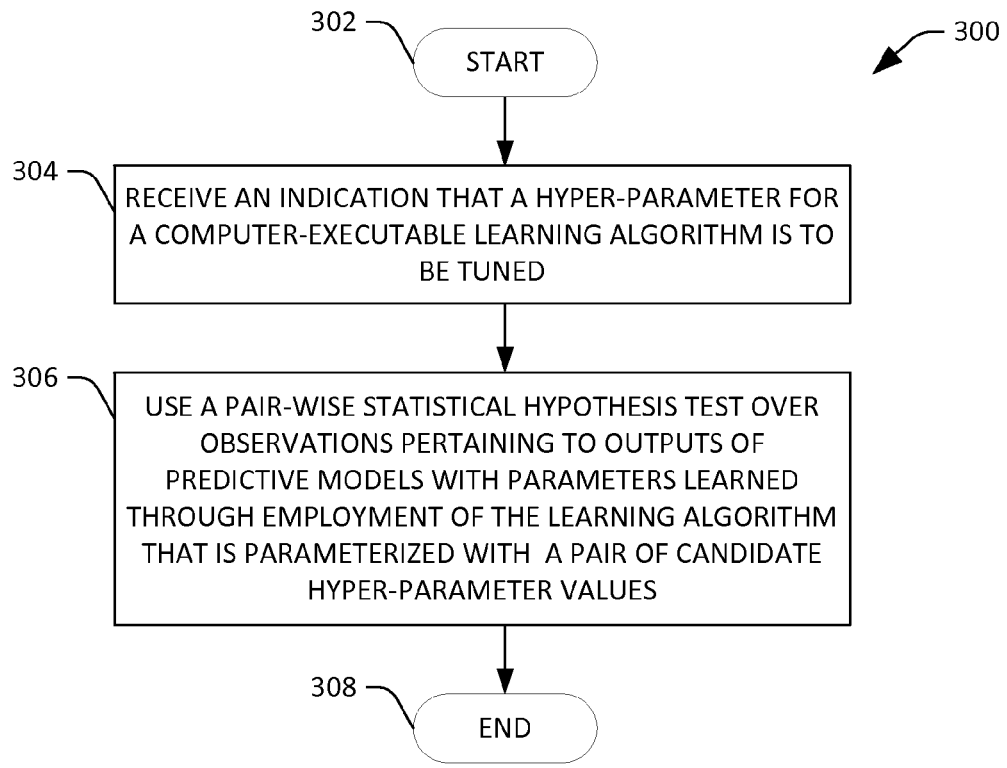
FIG. 3 is a flow diagram that illustrates an exemplary methodology for using pair-wise statistical hypothesis testing in connection with identifying an optimal hyper-parameter configuration of a learning algorithm.
Figure 4:
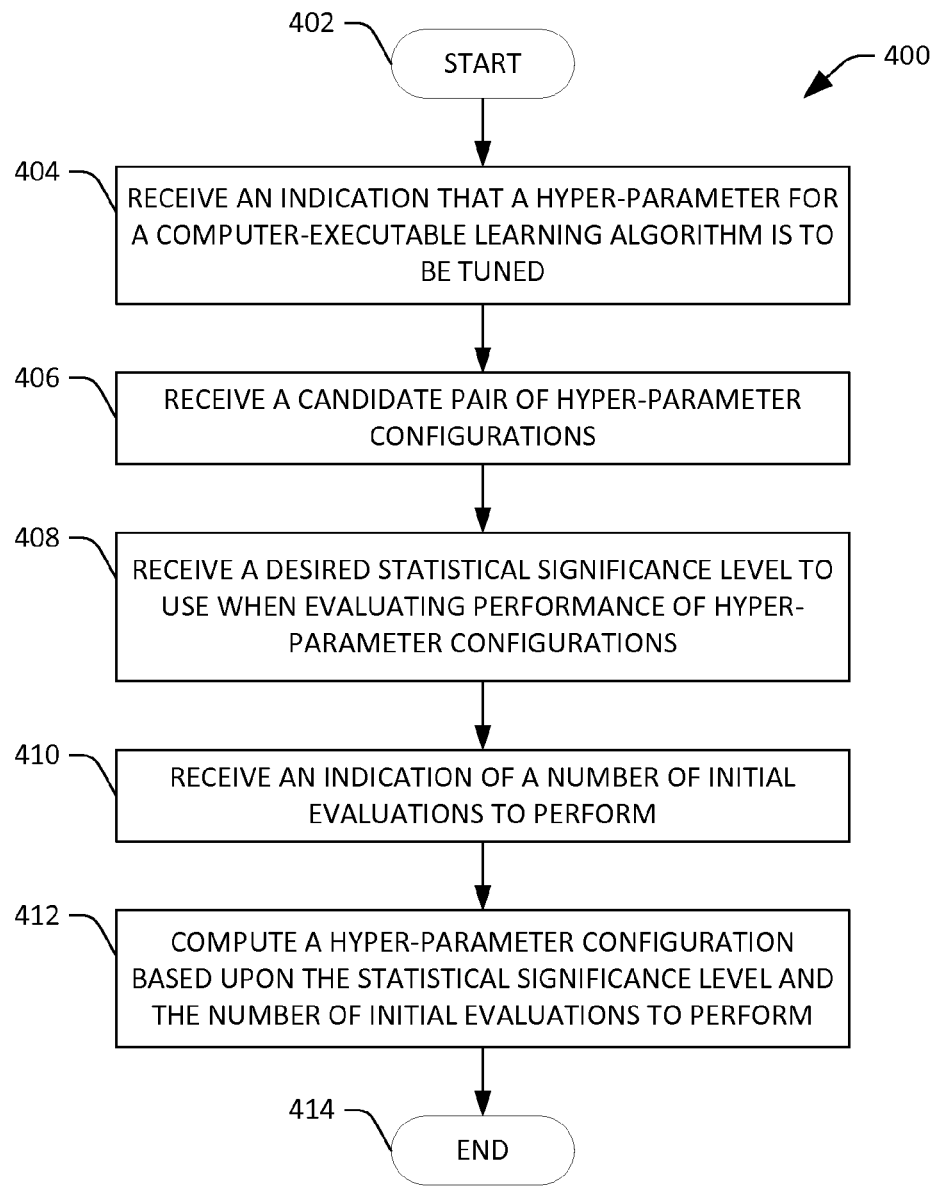
FIG. 4 is a flow diagram that illustrates an exemplary methodology for computing a hyper-parameter configuration as a function of a statistical significance level and a number of evaluations to perform with respect to outputs of predictive models that are learned based upon candidate hyper-parameter configurations.
Figure 5:
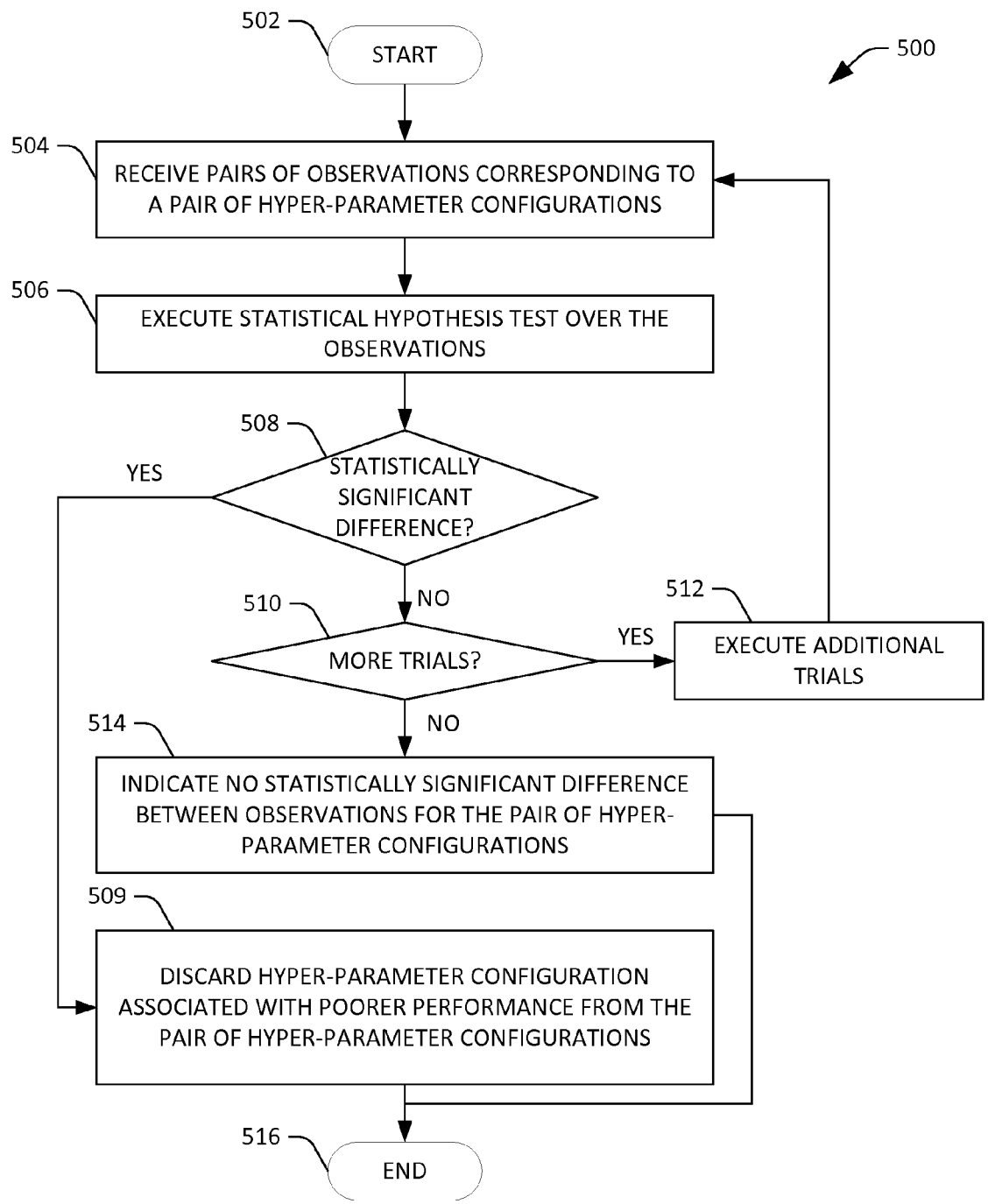
FIG. 5 is a flow diagram that illustrates an exemplary methodology for outputting an indication that a hyper-parameter configuration is a candidate for being an optimal hyper-parameter configuration of a learning algorithm.

FIGS. 3-5 illustrate exemplary methodologies relating to tuning hyper-parameters of a learning algorithm. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 3, an exemplary methodology 300 that facilitates use of pair-wise statistical hypothesis testing in connection with identifying an optimal hyper-parameter configuration for a learning algorithm used to learn a predictive model for a particular task (e.g., based on a certain set of training data) is illustrated. The methodology 300 starts at 302, and at 304 an indication that a hyper-parameter for a computer-executable learning algorithm is to be tuned is received. As described above, the hyper-parameter is a parameter for a computer-executable learning algorithm that is configured to learn parameters of a predictive model as a function of a value of the hyper-parameter.

At 306, a pair-wise statistical hypothesis test is used, over observations pertaining to outputs of a pair of predictive models with respective parameters learned through employment of the computer-executable learning algorithm (which is parameterized with a candidate pair of hyper-parameter values), to identify an optimal hyper-parameter value for the hyper-parameter. That is, the value for the hyper-parameter is assigned based upon such pair-wise statistical hypothesis test. Hence, rather than performing a strict numerical comparison on outputs of an evaluation function relative to predictive models, the methodology 300 considers stochasticity in the underlying training and validation data, as well as stochasticity in the learning algorithm and the evaluation function, when efficiently identifying an optimal hyper-parameter configuration for the learning algorithm. The methodology 300 completes at 308.

Now, referring to FIG. 4, an exemplary methodology 400 for computing a hyper-parameter configuration for a computer-executable learning algorithm is illustrated. The methodology 400 starts at 402, and at 404 an indication that a hyper-parameter configuration for a computer-executable learning algorithm is to be tuned is received. As described herein, the learning algorithm is tasked with learning parameters of a predictive model, which is to be configured to perform a particular predictive task. The learning algorithm learns such parameters based upon its hyper-parameter configuration and training data.

At 406, a candidate pair of hyper-parameter configurations for the learning algorithm are received. Each candidate configuration in the pair may include values selected from a finite space and/or values selected from a continuous space. As indicated above, in practice, multiple pairs of hyper-parameter configurations may be received.

At 408, a desired statistical significance level to use when evaluating performance of the learning algorithm when parameterized with the candidate hyper-parameter configurations in the pair is received. Such statistical significance level can be selected, for instance, as a function of resource constraints (e.g. fewer trials may be necessary if the statistical significance level is relaxed). It can be ascertained, however, that if the statistical significance level is relaxed, accuracy may be adversely affected. In an exemplary embodiment, the statistical significance level can be relaxed as candidate hyper-parameter configurations are eliminated.

At 410, an indication of a number of initial evaluations to perform is received. At 412, a hyper-parameter configuration is identified based upon the statistical significance level and the number of initial valuations to perform. With more specificity, a pair-wise statistical hypothesis test over observations pertaining to predictive models that are trained based upon a respective pair of candidate hyper-parameter configurations can be executed, wherein such statistical hypothesis test is executed based upon the statistical significance level and the number of initial evaluations to perform. Such process can be undertaken over numerous pairs of candidate hyper-parameter configurations. The methodology 400 completes at 414.

Now referring to FIG. 5, an exemplary methodology 500 for identifying an optimal hyper-parameter configuration for a computer-executable learning algorithm (with respect to a particular predictive task) is illustrated. The methodology 500 starts at 502, and at 504 a pair of observations corresponding to a pair of hyper-parameter configurations are received. For instance, such pair of observations can be outputs of an evaluation function based upon outputs of a predictive model (when analyzed using a validation data set). At 506, a statistical hypothesis test is executed over such the pair of observations. At 508, a determination is made regarding whether there exists a statistically significant difference between the observations based upon the statistical hypothesis test. If there is a statistically significant difference, then the hyper-parameter configuration that is associated with poorer performance is discarded as being a candidate hyper-parameter configuration at 509. If there is no statistically significant difference, then at 510 a determination is made regarding whether an additional trial is to be undertaken, thereby reducing uncertainty in observations. If there are additional trials to be undertaken, the methodology 500 proceeds to 512, where additional trials are executed, thereby generating more sets of observations. If there are no more trials, then at 514 an indication can be output that there is no statistically significant difference between observations pertaining to the pair of hyper-parameter configurations. The methodology completes at 516.

Figure 6:
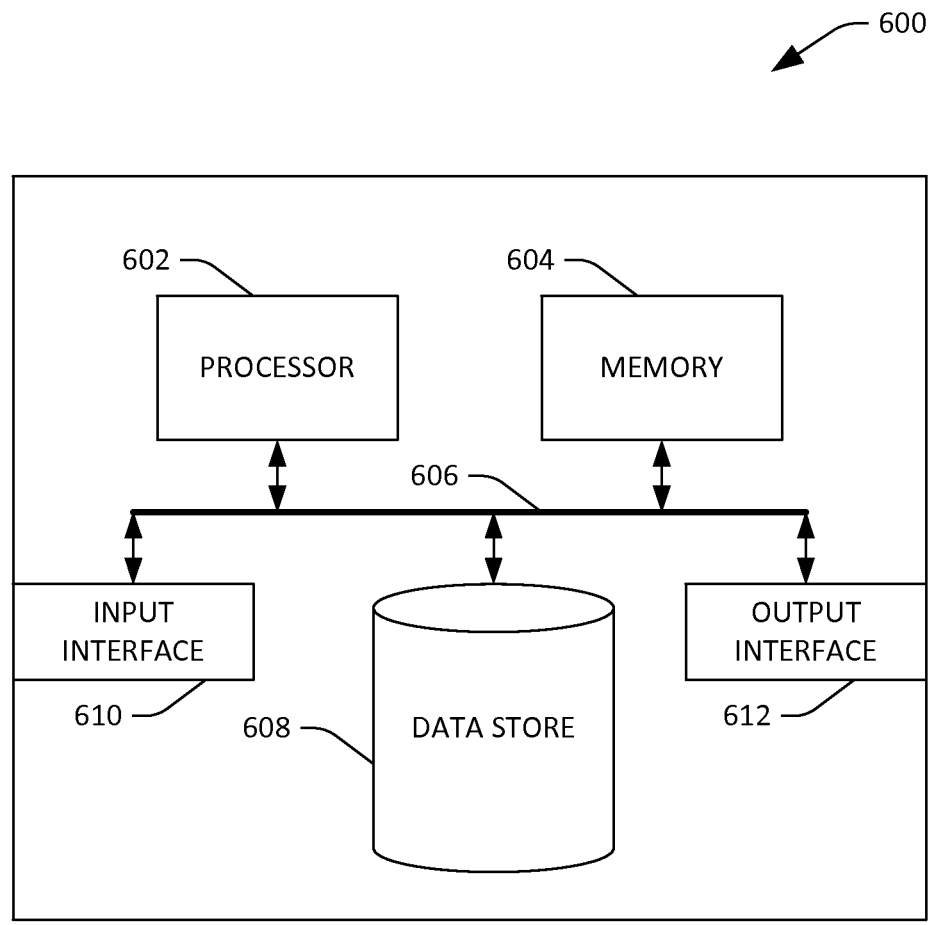
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that supports tuning hyper-parameters of a learning algorithm. By way of another example, the computing device 600 can be used in a system that supports identifying an optimal hyper-parameter configuration for a particular predictive task. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store a validation fold, candidate hyper-parameter configurations, training data, etc.

The computing device 600 additionally includes a data store 608 that is accessible by the processor 602 by way of the system bus 606. The data store 608 may include executable instructions, validation data, training data, candidate hyper-parameter configurations, observations output by an evaluation function, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
receiving an indication that a hyper-parameter of a computer-executable learning algorithm is to be tuned, the hyper-parameter being a parameter of the computer-executable learning algorithm, the computer-executable learning algorithm configured to learn other parameters of a predictive model based upon the hyper-parameter; and
assigning a value to the hyper-parameter based upon a pair-wise statistical hypothesis test undertaken over observations pertaining to a pair of candidate hyper-parameter values, the observations generated based upon outputs of a pair of predictive models that respectively correspond to the pair of candidate hyper-parameter values, the outputs based upon a common set of labeled validation data.

2. The method of claim 1, wherein the indication that the hyper-parameter is to be tuned is an indication that a hyper-parameter configuration for the computer-executable learning algorithm is to be tuned, the hyper-parameter configuration comprising a plurality of hyper-parameters; and
assigning respective values to the plurality of hyper-parameters based upon pair-wise statistical hypothesis tests undertaken over observations pertaining to respective predictive models having parameters that are based upon respective hyper-parameter configurations.

3. The method of claim 1, further comprising:
identifying candidate hyper-parameter values from a finite space of discrete values, wherein the value assigned to the hyper-parameter is selected from the candidate hyper-parameter values.

4. The method of claim 1, identifying candidate hyper-parameter values from a continuous space, wherein the value assigned to the hyper-parameter is selected from the candidate hyper-parameter values.

5. The method of claim 1, wherein assigning the value to the hyper-parameter is based upon executing a plurality of trials, wherein after each trial in the plurality of trials a respective statistical hypothesis test is undertaken over observations pertaining to pairs of candidate hyper-parameter configurations.

6. The method of claim 1, wherein assigning the value to the hyper-parameter comprises:
evaluating the observations based upon a predefined value of statistical significance; and
selecting the value for the hyper-parameter based upon the evaluating of the observations.

7. The method of claim 1, further comprising using direct-search derivative-free optimization in connection with assigning the value to the hyper-parameter.

8. The method of claim 1, further comprising using power analysis in connection with performing a threshold number of evaluations over the candidate pair of hyper-parameter configurations.

9. The method of claim 1, wherein assigning the value to the hyper-parameter comprises performing a paired t-test.

10. A system, comprising:
at least one processor; and
memory that stores instructions that, when executed by the at least one processor, causes the at least one processor to perform acts comprising:
receiving an indication that a hyper-parameter configuration of a learning algorithm is to be ascertained, the learning algorithm configured to learn parameters of a predictive model; and
employing statistical hypothesis testing in connection with identifying a value for a hyper-parameter included in the hyper-parameter configuration, wherein the value for the hyper-parameter is useable by the learning algorithm to learn the parameters of the predictive model, and the statistical hypothesis testing is undertaken over observations pertaining to outputs of the predictive model with respect to a set of validation data.

11. The system of claim 10, wherein the hyper-parameter is one of a learning rate or a regularization coefficient.

12. The system of claim 10, the acts further comprising generating the observations based upon outputs of the predictive model over the set of validation data.

13. The system of claim 12, the observations being indicative of performance of the predictive model over the set of validation data.

14. The system of claim 13, the acts further comprising:
comparing observations pertaining to a pair of candidate hyper-parameter configurations; and
performing the statistical hypothesis testing based upon the observations.

15. The system of claim 14, wherein comparing the observations is based upon a level of statistical significance to be considered when performing the statistical hypothesis testing.

16. The system of claim 14, the acts further comprising causing multiple trials to be undertaken with respect to a pair of candidate hyper-parameter configurations.

17. The system of claim 11, the acts further comprising executing a search over a continuous numerical space to identify candidate hyper-parameter configurations.

18. The system of claim 11, the acts further comprising performing cross-validation in connection with identifying the value for the hyper-parameter.

19. The system of claim 11, the acts further comprising validating performance of the predictive model by way of bootstrapping.

20. A computer-readable storage medium comprising instructions that, when executed by a processor, causes the processor to perform acts comprising:
receiving an indication that a hyper-parameter configuration of a computer-executable learning algorithm is to be tuned, the computer-executable learning algorithm configured to learn parameters of a predictive model based upon the hyper-parameter configuration and a set of training data;
responsive to receiving the indication, receiving a pair of candidate hyper-parameter configurations of the computer-executable learning algorithm;
receiving a desired statistical significance level to use when evaluating performance of a pair predictive models that respectively correspond to the pair of candidate hyper-parameter configurations;
receiving an indication of a number of initial evaluations to perform with respect to the pair of candidate hyper-parameter configurations;
executing a pair-wise statistical hypothesis test over a pair of observations output by an evaluation function that respectively correspond to the pair of candidate hyper-parameter configurations, the statistical hypothesis test executed based upon the statistical significance level and the number of initial evaluations to perform; and assigning the hyper-parameter configuration to the computer-executable learning algorithm based upon the executing of the pair-wise statistical hypothesis test.

\* \* \* \* \*